(12) United States Patent
Giacomini

(10) Patent No.: US 6,789,782 B2
(45) Date of Patent: Sep. 14, 2004

(54) VALVE FOR GAS SYSTEMS

(75) Inventor: Luca Giacomini, Madonna del Sasso (IT)

(73) Assignee: Giacomini S.p.A., S. Maurizio d'Opaglio (IT)

( * ) Notice: Subject to any disclaimer, the term of this patent is extended or adjusted under 35 U.S.C. 154(b) by 61 days.

(21) Appl. No.: 10/220,351

(22) PCT Filed: Dec. 28, 2001

(86) PCT No.: PCT/EP01/15363

§ 371 (c)(1), (2), (4) Date: Jan. 14, 2003

(87) PCT Pub. No.: WO02/053956

PCT Pub. Date: Jul. 11, 2002

(65) Prior Publication Data

US 2003/0173534 A1 Sep. 18, 2003

(30) Foreign Application Priority Data

Dec. 29, 2000 (IT) .......................................... CO00A0027

(51) Int. Cl.[7] ............................................... F16K 5/06
(52) U.S. Cl. .................. 251/315.06; 137/382; 137/797
(58) Field of Search .................... 251/315.01, 315.06; 137/315.18, 382, 797, 551; 222/153.05, 153.06

(56) References Cited

U.S. PATENT DOCUMENTS

| 5,467,796 A | * | 11/1995 | Pettinaroli et al. | .......... 137/238 |
| 5,938,173 A | * | 8/1999 | Hayakawa | .................. 251/214 |
| 6,467,500 B2 | * | 10/2002 | Fridlyand | .................... 137/385 |

FOREIGN PATENT DOCUMENTS

| DE | 40 02 926 | 8/1991 |
| EP | 0 300 403 | 1/1989 |
| GB | 2 098 298 | 11/1982 |

* cited by examiner

Primary Examiner—Edward K. Look
Assistant Examiner—John K. Fristoe, Jr.
(74) Attorney, Agent, or Firm—Young & Thompson

(57) ABSTRACT

An improved ball valve (1), in particular for gas systems, includes a tampering indicating seal (25) made by injection molding a synthetic or metal material into cavities (19; 21; 22) formed in the screw-clamping nut assembly (11, 13) and including a cap outer portion (29) which substantially covers the surface of the outer face of the nut (13) and/or extending (29A) on the side surface of the nut (13).

9 Claims, 4 Drawing Sheets

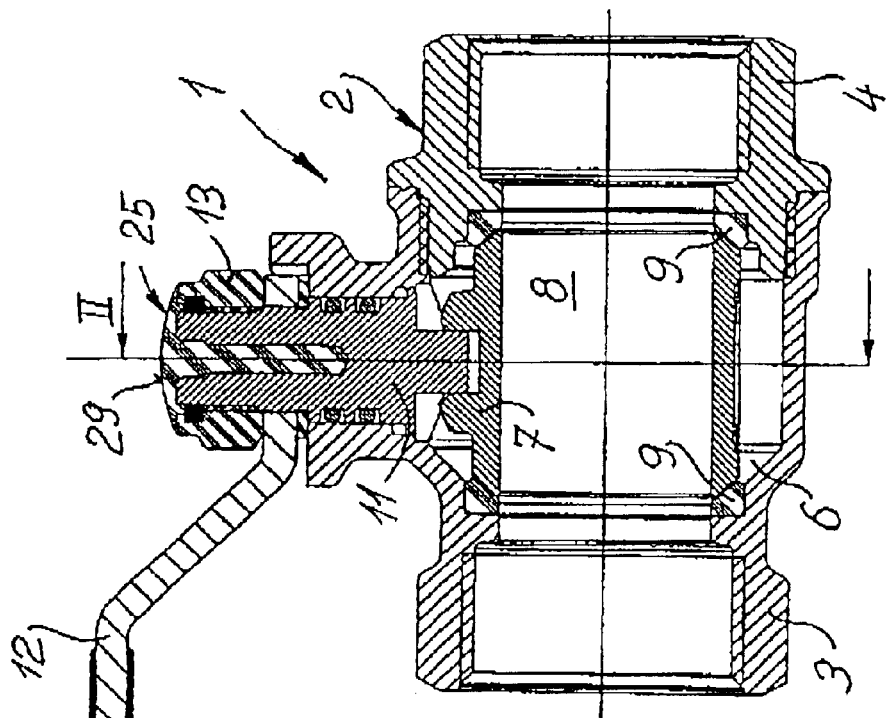
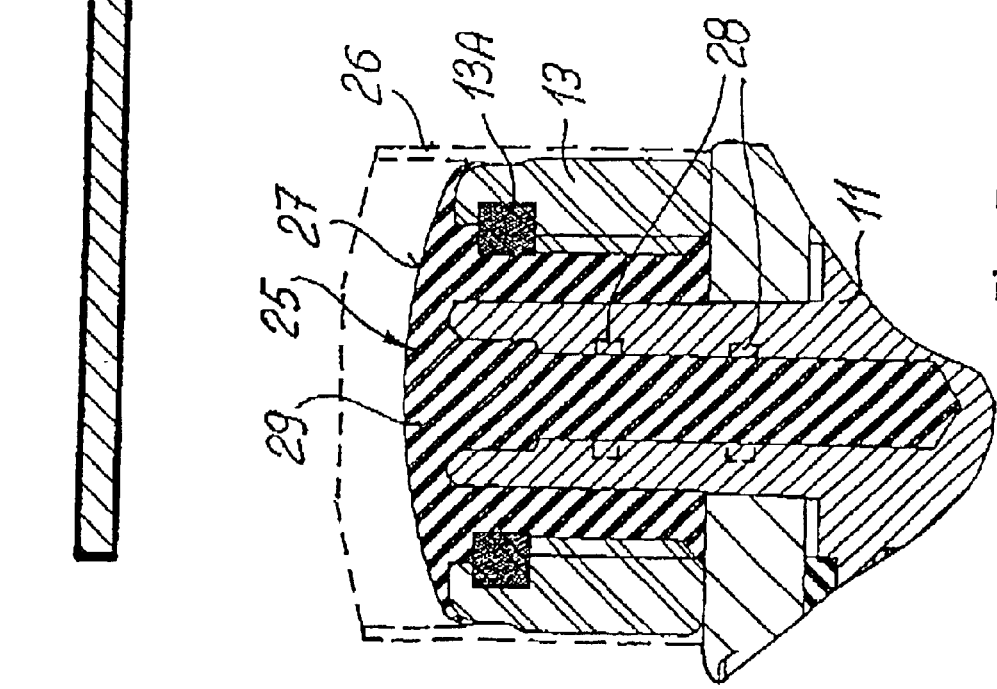

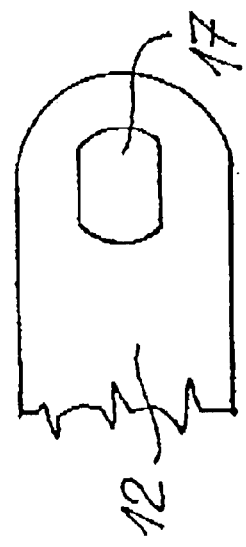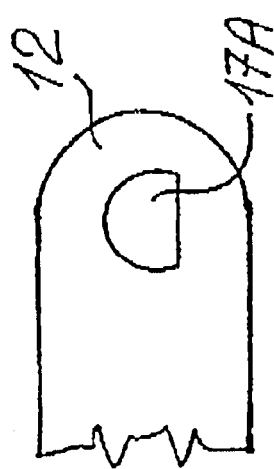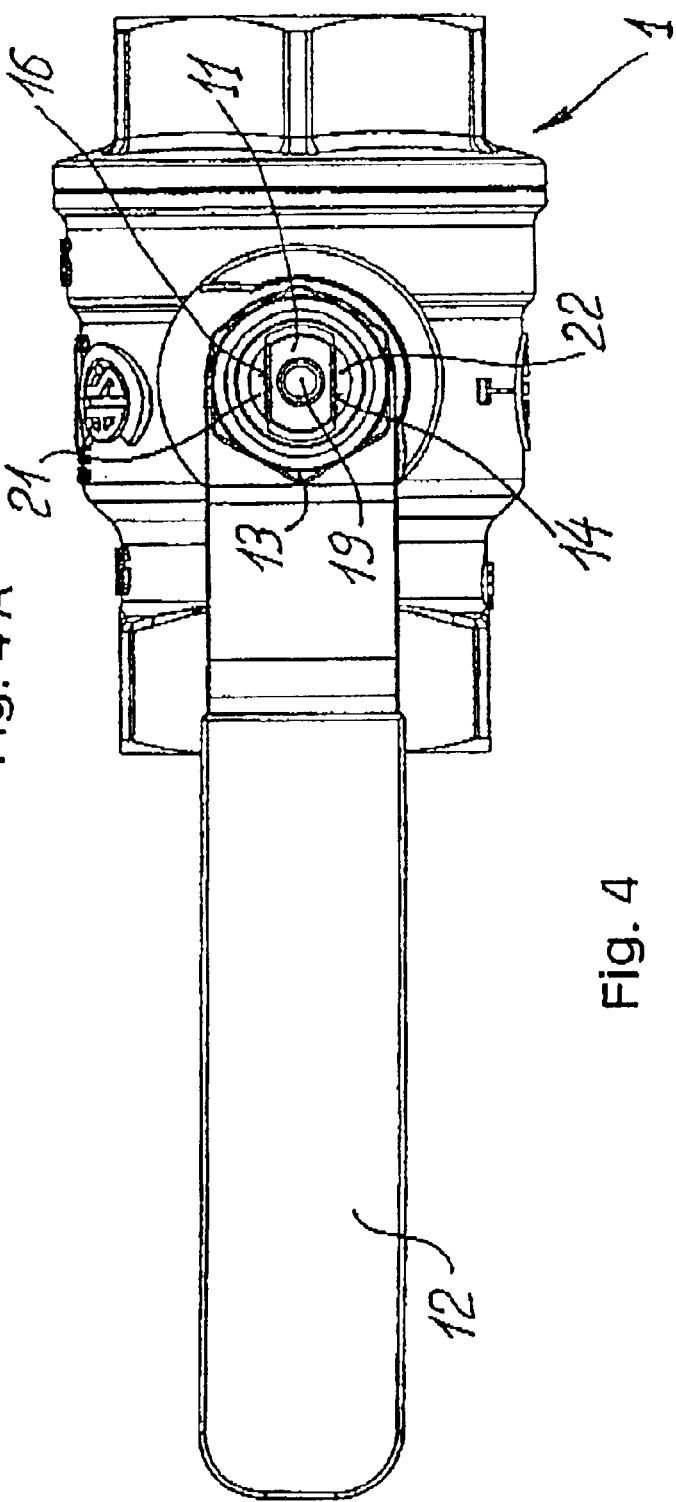
Fig. 4A
Fig. 4B
Fig. 4

VALVE FOR GAS SYSTEMS

BACKGROUND OF THE INVENTION

The present invention relates to an improved ball valve, specifically designed for domestic and industrial gas systems, according to the preamble of claim 1.

Ball valves in general, and in particular for domestic and industrial gas systems, can optionally comprise tampering indicating means, designed to clearly indicate a possible tampering of the valve manual operating elements, such as operating knobs, levers or the like, which will be hereinafter generically called "driving lever", and which are coupled to a screw element for rotatively driving a valve ball shutter, by geometrically engaging it, and being clamped on said screw element by a clamping threaded nut engaged on a free threaded end portion of the screw element.

The above mentioned a geometric fitting is usually performed by providing two parallel and opposite flat portions at the free threaded end of the screw element and a corresponding opening, having parallel sides coupled by portions of a circumference of a diameter corresponding to the screw outer diameter, through the lever, so as to engage the clamping nut on said threaded portions of the screw. In particular, after having assembled and locked the lever by the nut, between the inner circumference of said nut and said screw flat portions, two free chambers, closed at the bottom by the lever and freely communicating at the top thereof with the outside, will be formed.

For meeting machining accuracy requirements, the outer threaded end of the screw is moreover formed with a blind hole which, upon assembling, is left free.

Starting from the above disclosed prior art ball valve construction, two approaches for indicating a possible tampering have now been herein devised, the first of which provides to apply a colored paint drop or strip extending from a point of the nut side surface to the adjoining underlying driving lever, thereby a tamper of the lever, i.e. an unthreading of the nut, would cause an visually detectable breaking of the paint drop or strip.

However, in actual practice, such a visual detection of the paint drop or strip breakings is hindered both by the small surface of the paint drop or strip and by the fact that said breaking usually consists of a thin cross slit which, upon re-screwing the nut, would be not longer apparent.

The main drawback of this approach, however, is that, the tampering can be easily concealed by simply applying a further paint strip or drop on the broken slit.

The second approach, being adopted by the Applicant, provides to use a nut housing therein, at its outer end, a plastic material ring which, upon threading the nut on the screw, is self-threaded on the screw to be clearly seen from the outside. Thus, upon unthreading said nut, the plastic material ring, which is properly colored, disengages therefrom to clearly indicate its tampering.

The above mentioned approaches, moreover, can be hardly standardized by some Foreign State Authorities, for example based on the European standard En 331/1998 stating a lot of requirements on visually showing possible tamperings in ball valve.

SUMMARY OF THE INVENTION

Accordingly, the aim of the present invention is to provide a ball valve in which it would be very easy to visually show possible tamperings thereof.

The above mentioned aim is achieved, according to the invention, by a ball valve having the features of claim 1.

Further advantageous embodiments are disclosed in the dependent claims.

Claim 2 discloses a very simple embodiment of the invention, having a single anchoring cavity and providing an easily visually detectable anti-tampering seal, anchored in a reliable manner.

Claim 3 discloses a first modified embodiment including a double anchoring cavity.

Claim 4 discloses a triple anchoring chamber, providing a very reliable anchoring or clamping of the valve anti-tampering indicating means.

As disclosed in claim 5, the outer portion of the anti-tampering means or seal extends through the overall outer face of the clamping nut, thereby it can be clearly univocally seen.

This vision facility and clearness is further improved by the solution claimed in claim 6.

As disclosed in claim 7, the anchoring cavities provided herein have a small height thereby conventional or depressed clamping nuts can be used.

As disclosed in claim 8, a plastic material or a low melting metal or metal alloy, such as a lead, tin alloy, can be used as the injectable or molding material.

As disclosed in claim 9, it is possible to clearly visually detect a performed tampering.

Thus it should be apparent that the invention provides a lot of important advantages, such as a visually clear indication of a tampering. Moreover, upon tearing away, the anti-tampering seal cannot be reconstructed thereby providing a permanent tampering indication. While the herein proposed anchoring cavities can be suitably dimensioned and shaped appropriately depending on their molding material, it is advantageously possible to use the cavities already existing in prior ball valves, so as to use them either fully or partially as anchoring cavities for anchoring the injected material therein.

A further advantage is that the subject anti-tampering seals are firmly clamped in the cavities housing the molding material which, during the injection molding operation, will fill in any undercuts formed by the clamping nut thread and/or any slots formed in the screw centering blind hole, or the roughness of said anchoring cavities.

A further advantage is that the molding material can comprise any desired plastic materials or low melting metals or metal alloys. By using conventional or recessed nuts, it is moreover possible to reduce the height of the screw threaded portion, to provide a corresponding reduction of the required material amount. Even if small, such a material saving would be very important in a large series making said ball valves.

Yet another advantage is that the injection molding of said filling material is advantageously performed after having fully assembled and possibly tested the valve, thereby the anti-tampering seal also assure a perfectly reliable operation of the valve.

Yet another advantage is that the injection head, or injection molding head, has a simple bush shape and is removably fitted, by a geometrical type of engagement, on the valve locking nut/screw assembly.

BRIEF DESCRIPTION OF THE DRAWINGS

Further characteristics, advantages and details of the improved ball valve according to the present invention will become more apparent hereinafter from the following disclosure of some embodiments thereof, which are shown, by way of an example, in the accompanying drawings, where:

FIG. 1 is a vertical longitudinal sectional view of an improved ball valve according to the present invention, taken along the cross-sectional plane 1—1 of FIG. 2;

FIG. 3 illustrates, on an enlarged scale, the detail A of FIG. 2;

FIG. 4 is a top plan view of the valve of FIGS. 1 to 3;

FIG. 4A is a detail top view showing the end portion of the drive lever of the ball valve of FIGS. 1 to 4;

FIG. 4B shows a detail like that of FIG. 4A of a simplified modified embodiment of the geometrical fitting of the drive lever and valve screw;

DESCRIPTION OF THE PREFERRED EMBODIMENTS

Figure 5:
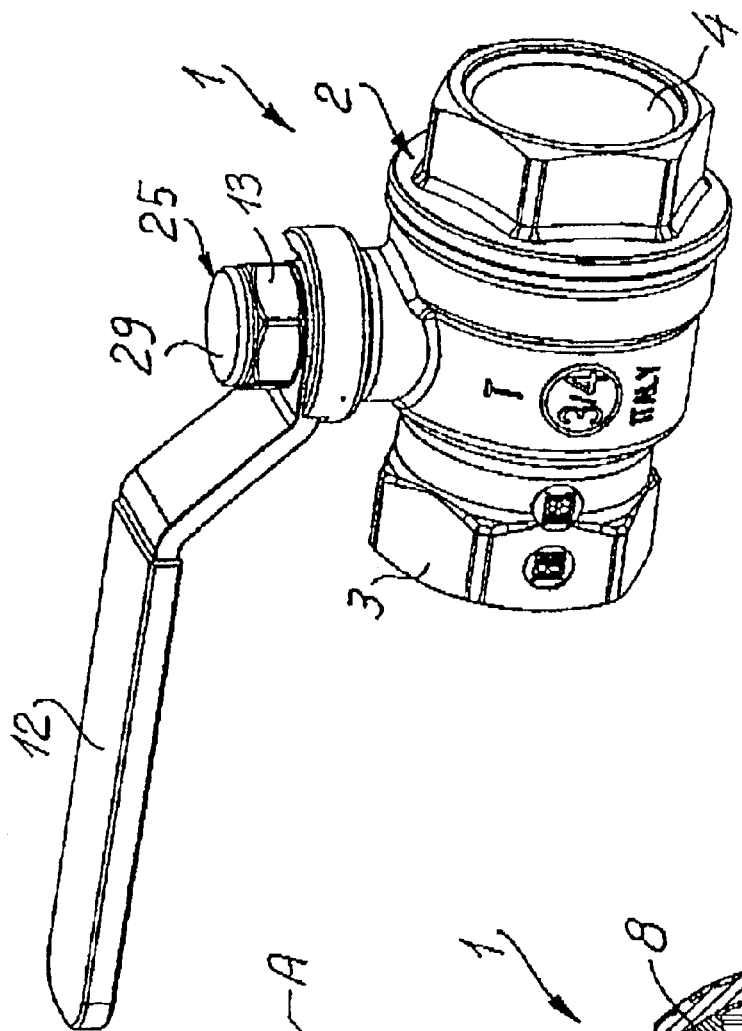
FIG. 5 is a perspective view illustrating the valve of FIGS. 1 to 4.
Figure 2:
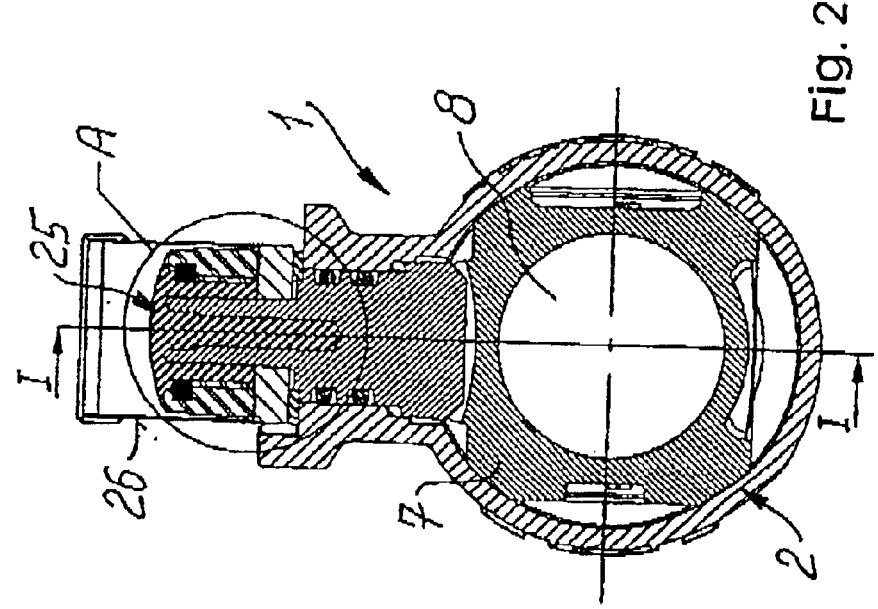
FIG. 2 is a further cross-sectional view taken along the section plane ii—ii of FIG. 1.

Through the figures, like parts have been indicated by like reference numbers.

With reference to a prior ball valve 1, for example a gas ball valve, it comprises a valve body 2 having an inlet 3 and an outlet 4, or vice-versa, and a chamber 6 arranged therebetween for housing therein a ball shutter 7 having a throughgoing hole 8 supported by opposite gaskets 9 and engageable by a driving screw 11 thereon can be assembled, by a geometrical type of engagement, a drive lever 12 to be clamped on said screw 11 by a clamping nut 13.

As shown in FIG. 4, for geometrically engaging said lever 12 and screw 11, the latter comprises, in the shown embodiment, two opposite flat portions 14, 16, while the lever 12 comprises a corresponding recess 17, see FIG. 4A.

At the threaded end portion 18 of the screw 11 an axial blind bole 19 is moreover provided. Upon assembling the clamping or locking nut 13 on the threaded end portion 18, between said screw 13 and flat portions 14, 16 of the screw 11, two chambers 21, 22, closed at the bottom by the top side of the lever 12 and, leading, at the top thereof, to the outside, are formed.

Said screw 11 and lever 12 can also be geometrically mated by using a single flat portion on the screw, for example the flat portion 14, to provide the recess 17A in the lever 12 with the configuration shown in FIG. 4B.

Said engagement of the screw 11 and lever 12 can also be made without providing flat portions on the screw 11, but merely a throughgoing pin orthogonally passing through the engagement end portion of the lever 12 and the screw 11, in a not shown manner.

Starting from the above disclosed prior art valves, the invention provides to include therein an anti-tampering seal, specifically designed for indicating an occurred tampering, which is formed in anchoring or clamping cavities which advantageously can be either already formed in said valves or can be specifically formed.

Reference is made at first to the anti-tampering seal provided for valves of the type shown in FIGS. 1 to 5.

According to the invention, the subject anti-tampering seal 25 is formed by injecting an injectable or molding material into at least a cavity of the assembly formed by the threaded end portion 18 of the screw 11 and clamping nut 13, which at least an anchoring cavity can comprise the axial blind hole 19. In the shown embodiment, the anchoring cavity further comprises two opposite cavities 21, 22 adjoining said blind hole 19, said cavities 19, 21 and 22 being all outward opened. Thus, by providing an injection head 26 adapted to be fitted on the clamping nut 13 and having a dome top 27, said cavities 19, 21 and 22 will be held in a communicating relationship. Accordingly, by injecting an injectable material into said chambers, they will be continuously filled in by said injectable material which, during the injection, will occupy the cut-outs formed, for example at the thread portions of said chambers 21 and 22 and possible annular slots 28 formed in the axial blind hole 19, as shown in FIG. 3. FIG. 3 shows moreover that the top 27 of the injection head 26 allows to provide the seal 25 with an outer portion 29, in the form of a disc cap, which substantially cover the overall outer face of the nut 13.

Figure 6:
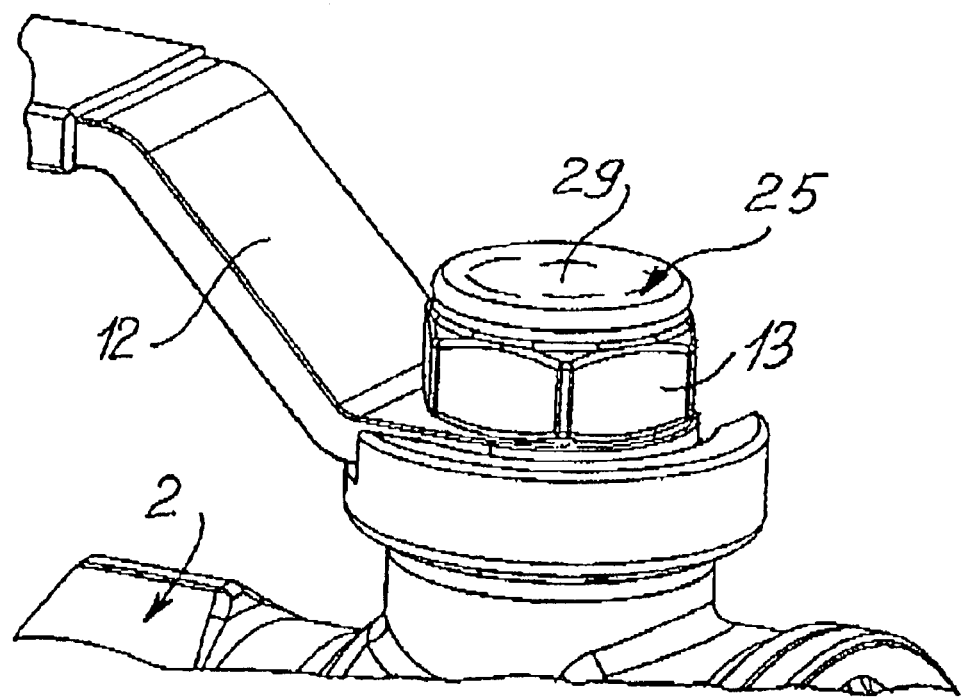
FIG. 6 is a detail perspective view illustrating the clamping nut/screw assembly of FIG. 5, and the tampering seal therefor.
Figure 7:
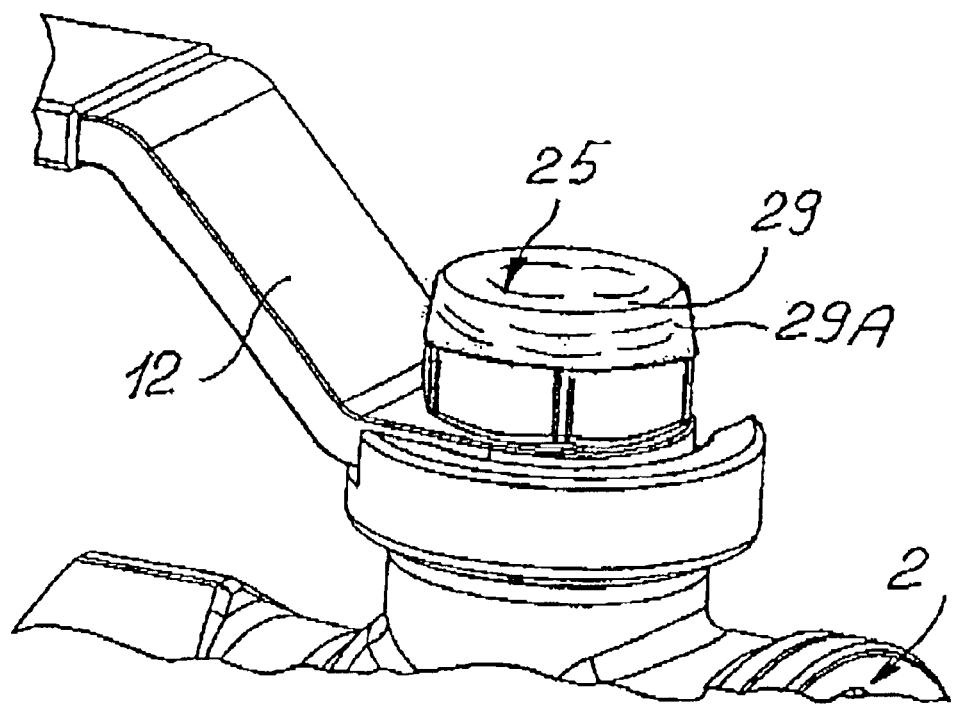
FIG. 7 illustrates a detail like that of FIG. 6, showing a modified embodiment of the anti-tampering seal.

In the embodiment shown in FIG. 7, the injection head 26 forms a downward directed extension 29A of the cap 29, thereby providing a cup configuration, which will be much more visually apparent than that of a seal 25 having a dome outer portion 29, as shown in FIG. 6.

The teaching of the invention of forming an anti-tampering seal 25 including three anchoring cavities, can be obviously also applied to valves having anchoring cavities of different number and/or configuration, or to a different type of geometric fitting, as shown, for example in FIG. 4B.

In actual practice, anyhow, the injection of said injectable material will be performed by conventional plastic material or metal material injection molding methods, for example for injecting lead, tin or alloys thereof, i.e. low-melting metals, thereby the injecting molding apparatus and methods will not be herein disclosed in further details since they are well known to one skilled in the art.

Finally, it should be pointed out that the firm anchoring provided by the invention also allows to reduce the height of prior nuts 13 including a plastic material ring 13A, or use conventional or recessed nuts, thereby reducing the heights of the anchoring cavities 19, 21 and 22 and that of the threaded portion of the screw 18 with a consequent decreasing of the material amount and machining steps for forming the screw.

It should be moreover apparent that the anti-tampering seal 25 can also be made on an already assembled and tested valve, thereby providing a very reliable valve.

In operation, an unthreading of the locking nut 13, or a tampering of the valve 1, will break the seal 25, to detach its outer portion, having a cap shape in the illustrated embodiment, thereby rendering clearly visually detectable said tampering.

This visual detection capability can be further enhanced by using a properly colored molding material, contrasting with the color of the lever 12 or valve body 2.

From the above constructional and functional disclosure, it should be apparent that the invention allows to efficiently solve the above mentioned aim and achieve the mentioned advantages. In actual practice, in addition to using the above mentioned anchoring cavities, it would be also possible to provide further anchoring cavities in the screw/anchoring nut assembly, for example by forming a cross hole passing through the nut and screw, in a not shown manner, or providing the cap portion with different shapes, without departing from the scope of the invention.

In addition to gas system ball valves, the improved ball valves according to the present invention can also be used in any application fields, such as in hydro-thermal-sanitary systems.

What is claimed is:

1. An improved ball valve, for gas systems, comprising a valve body with an inlet and an outlet and a chamber arranged between said inlet and outlet for housing a ball actuator supported by opposite gaskets and adapted to be engaged by a driving screw thereon is mounted, by a geometrical engagement, a drive lever, which can be locked on said screw by a clamping nut, characterized in that in at least an anchoring cavity (19; 21; 22), provided either individually or in combination in the assembly formed by the threaded end portion (18) of the screw (1) and the clamping nut (13), an injectable molding material tampering indicating seal (25) is formed which is injected into said at least a cavity (19; 21; 22) and having a well visible, large surface, outer portion (29).

2. An improved ball valve according to claim 1, characterized in that said anchoring cavity is formed by an axial blind hole (19) extending in said threaded end portion (18) of the screw (11) and leading to the outside.

3. An improved ball valve according to claim 1, characterized in that said anchoring cavity further comprises at least a further cavity (21 or 22) adjoining said axial hole (19) and formed between an outer flat portion (14 or 16) of the screw (11) and the inner threaded surface of the clamping nut (13) clamped on said screw (11).

4. An improved ball valve according to claim 1, characterized in that said anchoring cavity further comprises two adjoining and opposite cavities (21, 22) formed by two outer opposite flat portions (14, 16) of said screw and the inner threaded surfaced of said clamping nut (13) clamped on said screw (11).

5. An improved ball valve according to claim 1, characterized in that the well visible outer portion of the tampering indicating seal (25) has a cap disc-like shape (29) substantially covering the outer face of said clamping nut (13).

6. An improved ball valve according to claim 5, characterized in that said disc-like cap (29) downward perimetrically extends on said clamping nut (13).

7. An improved ball valve according to claim 1, characterized in that said clamping nut (13) comprises either a conventional or a recessed clamping nut.

8. An improved ball valve according to claim 1, characterized in that said material, to be applied by injection molding methods or the like methods, comprises a plastic material or a low melting metal or metal alloy such as tin, lead or alloys thereof.

9. An improved ball valve according to claim 1, characterized in that said material forming said tampering indicating seal (25) is colored in a color contrasting against the color of said drive lever (12) and/or said valve body (2).

* * * * *